Patented Aug. 9, 1938

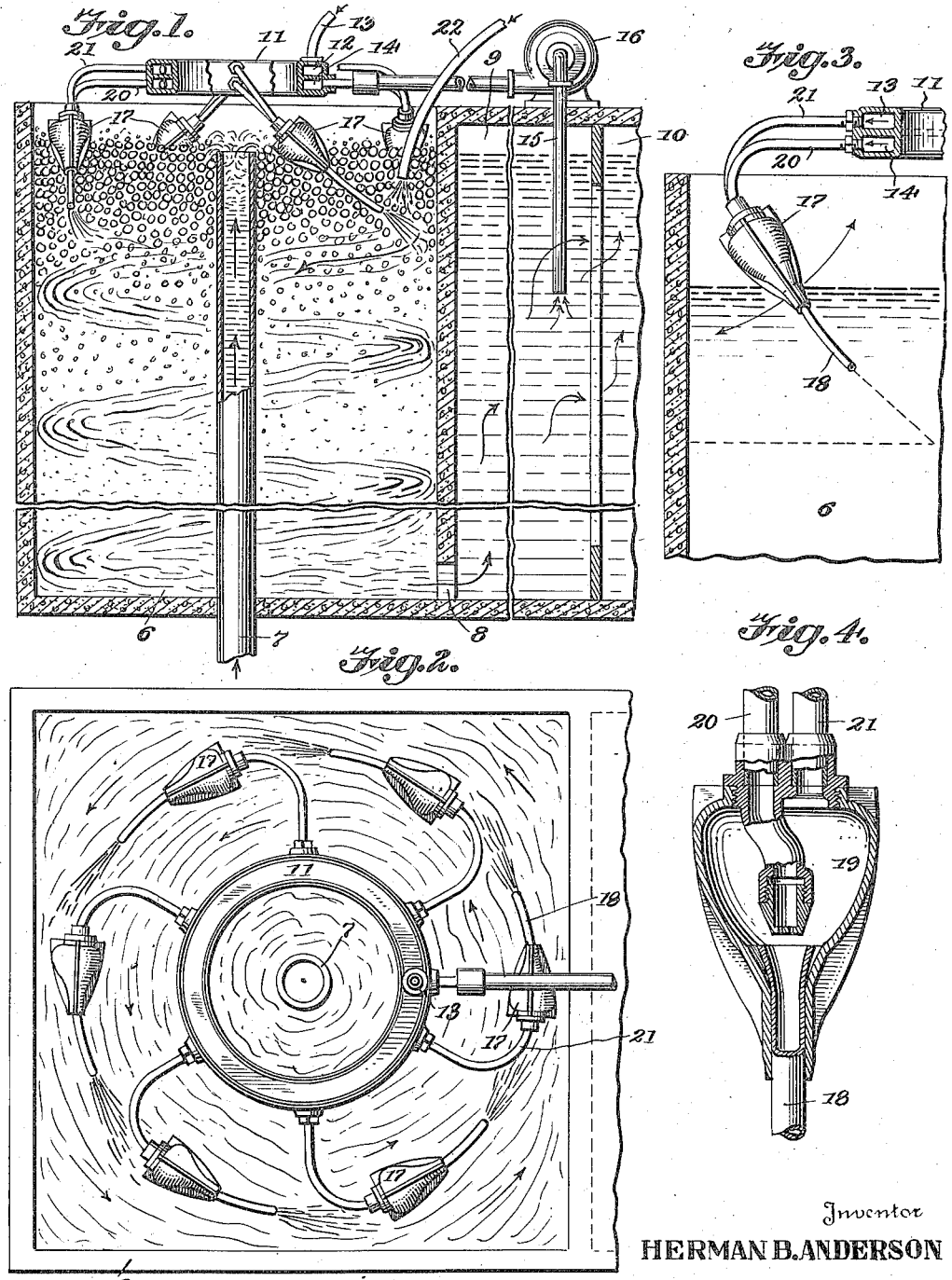

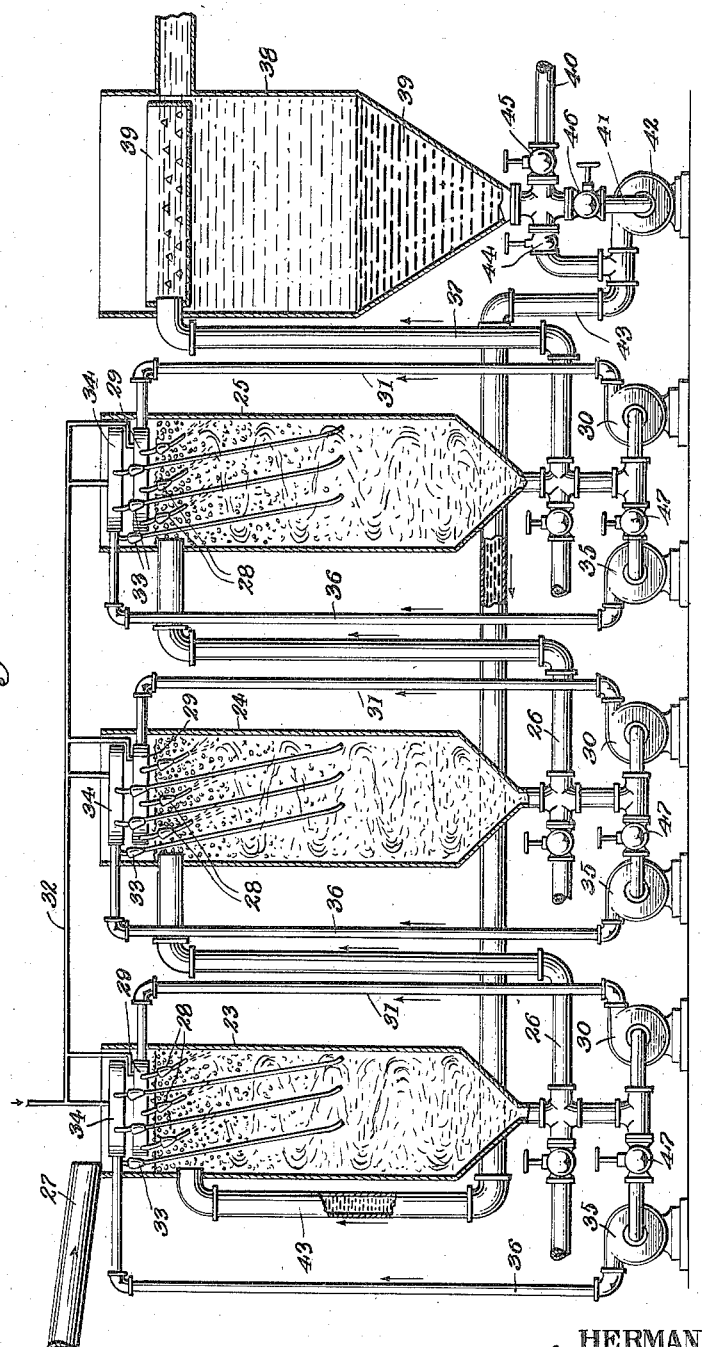

2,126,164

UNITED STATES PATENT OFFICE 2,126,164

APPARATUS FOR AND PROCESS OF TREATMENT OF LIQUID

Herman B. Anderson, Louisville, Ky.

Application October 29, 1935, Serial No. 47,333

6 Claims. (Cl. 210—26)

The present invention relates to the treatment of liquids, and more particularly to the mixing and conditioning of a liquid that is to be purified.

In the treatment of a liquid, for example, raw water where coagulants, such as sulphate of aluminum, are applied in solution, or mixtures in suspensions such as milk of lime or activated carbon are supplied, it is essential that a rapid and thorough admixture be obtained with the incoming liquid to be treated, and at a uniform rate in order to prevent streaming, stratification or settling.

In many liquid treating processes, it is necessary to treat the liquid with a gas. For example in the purification of water or sewage, air or other gas may be introduced for absorption by the liquid. Gases may also be used for agitating liquids. Examples of the use of gases are—air for aeration, treating lime-soda softened water with carbon dioxide for what is commonly called "recarbonation", or the application of sterilizing gases for the purpose of destroying bacteria.

Heretofore the introduction of gas into a liquid has been accomplished by liberating it at the bottom of a receptacle containing the liquid and allowing it to rise in the form of bubbles.

Bubbles that rise of their own buoyancy through a substantially still liquid are ordinarily relatively large and do not effectively mix with or agitate the liquid through which they rise, nor are they very greatly absorbed. To be effective, bubbles of gas must be of small size and great number in order that they do not rise rapidly and that they provide a large amount of surface area for contact with the liquid.

After a treating substance has been mixed with the liquid, a period of conditioning is necessary. This conditioning is a contact process, during which physical changes and chemical reactions take place. The building up of hydrate floc in the treatment of water, or the absorption of oxygen by sewage, are examples.

One object of the present invention is the provision of a process and of simple and effective apparatus whereby liquid to be treated is thoroughly mixed with one or more substances in either liquid, solid, or gaseous form.

Another object is the provision of apparatus that makes possible the mixing of liquid to be treated with a large number of minute gas bubbles.

Another object is to provide means for violently agitating the liquid.

Still another object is to provide for the thorough conditioning of the liquid after the mixing has taken place and agitating the mixture during this period.

These objects are attained by providing a combined mixing and conditioning basin or receptacle, having an inlet for liquid to be treated at its top and an outlet for treated liquid at its bottom, and having a series of injectors for supplying jets of liquid and entrained gas forcibly into the contents of the receptacle. The injectors direct the jets downwardly at an angle and at a tangent to the flow of liquid in the receptacle, and set up a zone of violent agitation at the top of the receptacle, from which zone the liquid flows in a swirling spiral current to the outlet at the bottom. The treating materials which may be solid or liquid are introduced into the zone of agitation and are thoroughly mixed with the liquid by the action of the jets.

In the accompanying drawings:

Figure 1 is a sectional view of one embodiment of the invention.

Figure 2 is a top plan view of the same.

Figure 3 is a sectional view showing one of the jets and manifold.

Figure 4 is a sectional view of one of the jets.

Figure 5 is a sectional elevation of a plant for the treatment of sewage.

In the embodiment shown in Figures 1-3 inclusive, which is primarily intended for the treatment of raw water, the treatment takes place in a tank or receptacle 6, which may have an open top. The receptacle 6 is provided with an inlet riser 7 that discharges centrally at the top of the tank and an outlet 8 that discharges from the bottom of the tank into a stilling chamber 9, from which the water flows to a settling basin 10.

This form of device is intended for use with the water floc-producing materials and with sterilizing or other gases, for example, air for aerating, and for agitating the water. For these purposes the tank is equipped with a circular manifold 11 which may be above the surface of the liquid in the tank, and which is located centrally with respect to the walls of the tank and the inlet riser. The manifold is divided into two passages, one of which 12 is supplied with gas or air, at atmospheric or above atmospheric pressure from a suitable gas line 13. The other passage 14 of the manifold is supplied with liquid under pressure, in this case with treated water which has passed through the tank 6 and is drawn from the stilling chamber 9 by means of a pipe 15 and delivered under pressure by means of a pump 16 to the passage 14 in the manifold.

The manifold carries a plurality of injectors 17, each of which has a nozzle 18 and a mixing chamber 19 (shown in cross section in Figure 4). The mixing chamber 19 surrounds the end of a liquid discharge tube 20 which is directed into the opening of the nozzle 18, whereby gas supplied to the chamber 19 by a gas pipe 21 is entrained in the jet of liquid.

The injectors 17 are supported by the pipes 20 and 21 which connect respectively with the liquid and gas passages of the manifold 11. These pipes are made of ductile metal, such as copper, in order to allow the position and angle of the jets to be changed for a purpose to be described later. The nozzles 18 are of a metal similar to that of the pipes 20 and 21.

Coagulants, such as sulphate of alumina, or other chemicals or chemical mixtures, may be supplied to the liquid in the tank 6 by means of a pipe 22 connected with a suitable source of supply. In operating the apparatus, the injectors 17 are adjusted at a downward angle with relation to the surface of the liquid in the tank, and they are also arranged at a tangent so that the jets delivered by them at high pressure tend to move the liquid in the tank in a circular direction, and as the liquid flows downwardly from the inlet to the outlet, it flows in the form of a swirling spiral.

The treatment of the liquid may be varied in accordance with its requirements by adjusting the angle of the injectors 17 and the nozzles 18 and the depth below the surface of the liquid at which the nozzles deliver the jets of liquid and gas. The violence of the agitation is controlled by the downward angle of the nozzles and the pressure at which the gas and liquid are delivered to the injectors, and also by the static pressure against which the nozzles 18 deliver the jets. The length of travel and circular rotating velocity for the passage of liquid through the tank is governed by the angle at which the nozzles are set. The size of the bubbles is determined by the pressure and velocity at which the gas and liquid are delivered to the manifold 11. All of these conditions are controllable in this apparatus. The angle and position of the nozzles is changed by bending the pipes 20 and 21 and by bending the nozzles 18, and the pressure of the fluids being controllable in an obvious manner. The static pressure against which the nozzles 18 deliver the jets is controlled by changing the depth below the surface at which they deliver.

While the liquid is shown as being drawn from the stilling chamber 9, it will be apparent that any suitable source of supply will be satisfactory. In the treatment of filtered water, for example, it has been determined that it is desirable to use water from the bottom of the clear well for delivery by the nozzles to agitate and aerate the water.

"Recarbonation" is a process of reducing the hydrogen in concentration or pH value of water which has been softened with lime-soda, with carbon dioxide. This apparatus may be used advantageously in this process, carbon dioxide gas being supplied to the gas line 13 and being injected into the water in the basin undergoing treatment. In such cases the pressure fluid supply for operating the injectors would be taken from or near the outlet of the basin, where the water has a reduced hydrogen ion concentration. In this manner the gas is injected by the water with the lowered concentration.

In the embodiment shown in Figure 5, the invention is adapted for the treatment of sewage. In this case a series of tanks 23, 24 and 25 are connected by conduits 26 from the bottom or outlet of one to the top of the next. Raw sewage is delivered from the delivery pipe 27 to the top of the first tank 23, where it is agitated by means of a plurality of injectors 28 similar to the jets 27 and mounted on a manifold 29, and supplied with treated liquid taken from the outlet of the tank 23 and returned to the jets by means of a pump 30 and pipe-line 31. Air or other gas is supplied to the manifold 29 by means of a pipe line 32.

In addition to the injectors 28 it has been found that it is advisable to additionally agitate the mixture and to provide for a more abundant supply of gas, and this is accomplished by making use of a second series of injectors 33 connected to a manifold 34 and delivering their streams at a point between the delivery point of the jets 28 and the outlet. The manifold 34 is similar in every way to the manifolds 11 and 29 and it is supplied with liquid from the outlet of the tank 23 by means of a pump 35 and pipe-line 36 and with gas from the gas line 32. The tanks 24 and 25 are both equipped similarly in every way to the tank 23, the liquid undergoing treatment being delivered from the bottom of one to the top of the next.

When the liquid leaves the bottom of the last tank 25, it may be conducted by means of a pipe 37 to the top of a sediment tank 38, passing through a distribution box 39 at the top thereof. In this tank subsidence and sedimentation takes place and activated sludge is deposited at the bottom of the tank as at 39, from where it may be drawn off through a sludge draw-off line 40. For promoting the early activation of the biologic life within the first treatment tank 23, a portion of the activated sludge in tank 38 may be withdrawn through suction line 41 to sludge pump 42 and discharged through a return sludge pipe 43 to the first treatment tank 23.

For controlling the apparatus of the plant, hand controlled valves are provided in the various pipe lines. Thus the flow of sludge from the tank 38 to the first tank 23 or to a sewer or sludge dryer through the pipe 40 is controlled by the valves 44, 45 and 46. The secondary jet systems may be controlled by the valves 47.

By the use of the apparatus great quantities of gas bubbles are entrained in the liquid, and these are of such minute size that they are carried completely through the tank. Their small size provides an enormous contact area and the length of time that they are submerged permits adequate absorption by the liquid. Thus in sewage treatment an adequate supply of air bubbles for the supplying of oxygen to accelerate the life of aerobic bacteria in the sewage liquid undergoing treatment is provided for. In raw water treatment the presence of such air bubbles accelerate the accretion of floc, as well as aerates the water and removes carbon dioxide. In lime-soda treated water, bubbles of carbon dioxide may be introduced to lower the pH value. Filtered water may be aerated and recirculated by the apparatus of this invention.

From the foregoing it is thought that the construction, operation and many advantages of the herein described invention will be apparent to those skilled in the art without further description, and it will be understood that various changes in the size, shape, proportion and minor details of construction may be resorted to without departing from the spirit or sacrificing any of the advantages of the invention.

What I claim, is:

1. In an apparatus for mixing and conditioning liquid, a receptacle having an inlet at its top and an outlet at its bottom so arranged that liquid will flow downwardly through the receptacle, and means for delivering at high velocity a stream of liquid having gas bubbles entrained therein, in a direction tangential to and at a point adjacent the periphery of the receptacle, and downwardly at an inclined angle to the direction of flow of the liquid in the receptacle.

2. In an apparatus for mixing and conditioning liquid, a receptacle having a central inlet at its top and an outlet at its bottom, the receptacle, inlet and outlet being so arranged that liquid will flow substantially vertically through the receptacle from the inlet to the outlet, an annular manifold surrounding the inlet at the top of the receptacle and having a passage for liquid and a passage for gas, means for supplying liquid and gas under pressure to the respective passages of the manifold, mixing devices, each having a gas chamber connected with the gas passage of the manifold, a jet upon one side of the gas chamber and connected with the liquid passage of the manifold for delivering a stream of liquid through the gas chamber whereby gas is entrained in the stream, and an outlet passage of substantially the same size as the jet arranged in the wall of the gas chamber opposite to the jet for receiving the stream delivered by the jet, and a nozzle connected to the outlet passage, the nozzles of the respective mixing devices being positioned to deliver the streams of liquid and gas bubbles at spaced points adjacent the periphery of the receptacle and about the inlet thereof, the said streams being delivered in directions tangential to the periphery of the receptacle and downwardly at angles inclined to the direction of flow of the liquid in the receptacle.

3. In an apparatus for mixing and conditioning liquid, a receptacle having an inlet at its top and an outlet at its bottom, the receptacle, inlet and outlet being so arranged that liquid will flow downwardly substantially vertically from the inlet to the outlet, a set of nozzles arranged to deliver streams of liquid and gas bubbles at high velocity to the liquid in the receptacle adjacent its surface and at points spaced about and adjacent to the periphery of the receptacle, the nozzles being arranged to deliver the streams in directions tangential to the periphery of the receptacle and downwardly at angles inclined to the direction of the flow of the liquid in the receptacle, a second set of nozzles arranged to deliver streams of liquid and gas bubbles to the liquid in the receptacle between the first set of nozzles and the outlet, the second nozzles also being arranged to deliver streams at points spaced about and adjacent the periphery of the receptacle in directions tangential to the said periphery and downwardly at inclined angles to the direction of flow of liquid in the receptacle, and means for supplying liquid having gas bubbles entrained therein to the sets of nozzles.

4. The process of mixing and conditioning a liquid that comprises continuously introducing liquid to the top of a body of the liquid in a receptacle, delivering at high velocity a jet of liquid having finely divided gas bubbles entrained therein to the top of the body of liquid at a point below and adjacent the surface thereof, and drawing off liquid from the bottom of the body, whereby the liquid moves downwardly from a zone of vigorous agitation and mixing caused in the upper part of the body by the jet to a relatively quiet conditioning zone, the finely divided gas bubbles being carried into the conditioning zone by the liquid.

5. The process of treating a liquid that comprises introducing the liquid into the top of a body of the liquid and withdrawing it from the bottom thereof, separating a portion of the liquid that has been withdrawn, entraining gas in the form of finely divided bubbles in the separated liquid and thereafter delivering it downwardly to the upper portion of the body of liquid at high velocity in the form of streams, subjecting the top portion of the body of liquid to violent agitation and the bottom portion to gentle agitation.

6. The process of lowering the hydrogen ion concentration of a liquid, that comprises introducing a flow of liquid to the top of a receptacle, introducing carbon dioxide in the form of finely divided bubbles by means of liquid under pressure directed downwardly adjacent and below the surface of the liquid in the receptacle, and withdrawing liquid from the bottom of the receptacle.

HERMAN B. ANDERSON.